United States Patent
Raman et al.

(10) Patent No.: US 11,226,953 B2
(45) Date of Patent: Jan. 18, 2022

(54) TECHNIQUE FOR GENERATING A CHANGE CACHE DATABASE UTILIZED TO INSPECT CHANGES MADE TO A REPOSITORY

(71) Applicant: Bentley Systems, Incorporated, Exton, PA (US)

(72) Inventors: Ramanujam Raman, Exton, PA (US); Affan Khan, Exton, PA (US); Krischan Eberle, Staufen (DE); Casey Mullen, Downingtown, PA (US)

(73) Assignee: Bentley Systems, Incorporated, Exton, PA (US)

( * ) Notice: Subject to any disclaimer, the term of this patent is extended or adjusted under 35 U.S.C. 154(b) by 156 days.

(21) Appl. No.: 16/156,824

(22) Filed: Oct. 10, 2018

(65) Prior Publication Data
US 2020/0117729 A1 Apr. 16, 2020

(51) Int. Cl.
*G06F 16/23* (2019.01)
*G06F 16/2455* (2019.01)

(52) U.S. Cl.
CPC ...... *G06F 16/2358* (2019.01); *G06F 16/2365* (2019.01); *G06F 16/2455* (2019.01)

(58) Field of Classification Search
CPC ............. G06F 16/2358; G06F 16/2455; G06F 16/2365
See application file for complete search history.

(56) References Cited

U.S. PATENT DOCUMENTS

| 5,758,150 | A  | * | 5/1998  | Bell ........................ G06F 16/27 |
| 6,526,418 | B1 | * | 2/2003  | Midgley ............. G06F 11/1451 |
|           |    |   |         | 707/640 |
| 7,395,258 | B2 |   | 7/2008  | Altinel et al. |
| 7,657,406 | B2 |   | 2/2010  | Tolone et al. |
| 9,998,551 | B1 | * | 6/2018  | Campbell ............... H04L 67/16 |
| 10,268,709 | B1 | * | 4/2019  | Suehs ................... G06F 16/211 |
| 10,558,529 | B2 |   | 2/2020  | Mayer et al. |
| 2005/0262048 | A1 | * | 11/2005 | Dettinger ............ G06F 16/2452 |
| 2006/0253419 | A1 | * | 11/2006 | Lin ....................... G06F 16/289 |
| 2008/0052719 | A1 | * | 2/2008  | Briscoe ............... H04L 41/0856 |
|           |    |   |         | 718/104 |
| 2009/0144696 | A1 | * | 6/2009  | Andersen .............. G06F 16/289 |
|           |    |   |         | 717/109 |

(Continued)

*Primary Examiner* — Cam Y T Truong
(74) *Attorney, Agent, or Firm* — Cesari and McKenna, LLP (57) ABSTRACT

In one embodiment, techniques are provided for generating a change cache database utilized to inspect changes made to a repository. Specifically, each of a plurality of client devices may maintain and make changes to a local briefcase representing an infrastructure and obtained from the repository. Information associated with each of the changes may be maintained and stored in a changeset at the client device and then transmitted and stored at a modeling hub services software. A change cache database may be generated at a client device based on locally generated changesets and/or received changesets. The change cache database includes a plurality of tables that store summary information from the changesets. The client device that generated and stores the change cache database may search the change cache database to determine what changes have been made to the repository.

14 Claims, 5 Drawing Sheets

(56) References Cited

U.S. PATENT DOCUMENTS

| | | | |
|---|---|---|---|
| 2010/0211662 A1* | 8/2010 | Glendinning | H04Q 3/0083 709/223 |
| 2011/0314138 A1* | 12/2011 | Kobayashi | G06F 11/0709 709/222 |
| 2013/0117232 A1 | 5/2013 | Lee et al. | |
| 2014/0172791 A1* | 6/2014 | Lasky | G06F 16/178 707/624 |
| 2015/0007176 A1* | 1/2015 | Kotani | G06F 9/45533 718/1 |
| 2019/0294722 A1 | 9/2019 | Mohan | |
| 2020/0117445 A1 | 4/2020 | Wilson et al. | |

* cited by examiner

Changesets Table — 305
- ChangeSetID: 1015, ParentChangeSetId: 1014, Description: "Change to flanges", Author: "John Gooding", PushDate: "10/1/2018 5:43 PM" — 310A
- ChangeSetID: 1016, ParentChangeSetId: 1015, Description: "Deletion of Pump", Author: "John Gooding", PushDate: "10/2/2018 7:00 PM" — 310B

ChangeSummaries Table — 315
- ChangeSummaryId: 100, ChangeSetID (Foreign Key): 1015, "ExtendedProperties:" — 320A
- ChangeSummaryId: 101, ChangeSetID (Foreign Key): 1016, "ExtendedProperties:" — 320B

ChangedInstances Table — 325
- ChangedInstanceId: 1, ChangeSummaryId (Foreign Key): 100, Changed Instance ID: 34, Change Type: Update — 330A
- ChangedInstanceId: 2, ChangeSummaryId (Foreign Key): 100, Changed Instance ID: 124, Change Type: Insert — 330B
- ChangedInstanceId: 3, ChangeSummaryId (Foreign Key): 101, Changed Instance ID: 31, Change Type: Delete — 330C

ChangedPropertyValues Table — 335
- ChangedInstanceId (Foreign Key): 1, ColumnName: col_dia, OldValue: 350, NewValue: 450 — 340A
- ChangedInstanceId (Foreign Key): 2, ColumnName: col_rating, NewValue: "F" — 340B
- ChangedInstanceId (Foreign Key): 2, ColumnName: col_material, NewValue: "steel" — 340C
- ChangedInstanceId (Foreign Key): 2, ColumnName: col_diameter, NewValue: 125 — 340D
- ChangedInstanceId (Foreign Key): 2, ColumnName: col_code, NewValue: "FL_3234" — 340E
- ChangedInstanceId (Foreign Key): 3, Delete all — 340F

TECHNIQUE FOR GENERATING A CHANGE CACHE DATABASE UTILIZED TO INSPECT CHANGES MADE TO A REPOSITORY

BACKGROUND

Technical Field

The present disclosure relates generally to computer-based infrastructure modeling, and more specifically to techniques for generating a change cache database utilized to inspect changes made to a repository.

Background Information

Throughout the design, construction and operation of an infrastructure (e.g., buildings, factories, roads, railways, bridges, electrical and communication networks, etc.) it is often desirable to model the infrastructure using infrastructure modeling software. A local copy of a briefcase, representing the infrastructure and obtained from a repository, may be maintained at different client devices that are individually or collaboratively working on the design, construction and operation of the infrastructure.

Each of the client devices may make one or more different changes to their local briefcase. Traditionally, a particular client device does not readily and easily have visibility into the changes made to the repository. In addition, the changes are not typically organized in such a manner that the client devices can search the changes to gain a better understanding of the development and modification of the repository from its genesis to completion.

SUMMARY

Techniques are provided for generating a change cache database that is utilized to inspect changes made to a repository (e.g., an infrastructure modeling repository). Specifically, each of a plurality of client devices may maintain and make changes to a local briefcase representing an infrastructure and obtained from a repository. Information associated with each of the changes may be stored in a changeset created at the client device and then transmitted and stored at a modeling hub services software. A client device may generate a change cache database based on one or more changesets generated locally and/or received from the modeling hub services software. The change cache database includes a plurality of tables that stores information from the changeset and, specifically, information that summarizes the different changes included in the changesets. The change cache database is searchable and the client device may, for example, search the change cache database to determine what changes have been made to the repository.

The change cache database provides users with the ability to implement more robust and efficient searches to inspect the changes that are made to the repository. Specifically, the results from a search of the change cache database may allow a user to understand the changes made to the repository. Advantageously, a particular user may learn of the changes made to the repository by other users over a particular time span. In addition, the change cache database provides the user with the ability to perform a structured analysis on a subset of the changes made to the repository, or on changes made to a particular element. For example, a client device may search the change cache database to analyze just the changes made to a particular infrastructure element.

It should be understood that a variety of additional features and alternative embodiments may be implemented other than those discussed in this Summary. This Summary is intended simply as a brief introduction to the reader and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION OF AN ILLUSTRATIVE EMBODIMENT

Definitions

As used herein, the term "infrastructure" refers to a physical structure or object that has been built, or is planned to be built, in the real-world. Examples of infrastructure include buildings, factories, roads, railways, pipe networks, etc.

As used herein, the terms "built infrastructure schema" or "BIS" refer to a type of conceptual schema (i.e. a conceptual data model) that describes the semantics of data representing infrastructure. BIS may be implemented using an underlying database (e.g., a SQLite database), with structures in BIS mapped to an underlying database schema (e.g., DgnDb) of the database.

As used herein, the term "infrastructure modeling repository", or simply "repository", refers to a distributed database. Each constituent database of the distributed database may be referred to as a "briefcase," as discussed below.

As used herein, the term "changeset" refers to a persistent electronic artifact that captures changes needed to transform a particular briefcase from one valid state to a new valid state. A changeset may be generated by recording changes made to the briefcase as they happen. A changeset that captures the changes needed to move the briefcase from one state (e.g., a state M) to another state (e.g., a state N) may be applied (in sequential order) to a copy of the briefcase at state M to update it to state N. The changeset may also be applied "in reverse" to transform a briefcase in state N back to state M.

As used herein, the term "briefcase" refers to a particular instance of a database (e.g., a SQLite database) that implements BIS. When a briefcase is used as a constituent database of a repository, the briefcase represents a materialized view of the information of a specific version of the repository. The repository in a state (e.g., a state M) is defined as the information resulting from sequentially applying all changesets up to and including changeset M to a "baseline" briefcase, for example an empty "baseline" briefcase. A briefcase holding version M of the repository can be updated to another version (e.g., a version Q) of the repository by applying to it the set of changesets from N to Q, inclusive.

As used herein, the term "element" refers to a record maintained in a briefcase. The element represents (i.e. "models", in a colloquial sense of the term) an entity in the real-world (e.g., pumps, beams, contracts, companies etc.). An element that represents an infrastructure entity in the real-world (e.g., a pipe, pump, beam, support, etc.) is referred to herein as an "infrastructure element."

As used herein, the term "aspect" refers to a set of properties that belong to a particular element, but which have an independent lifecycle (e.g., may come and go over the lifetime of an element). In one embodiment, individual aspects may be owned by individual elements, but are not individually identifiable and do not have incoming relationships other than from the element that owns it.

As used herein, the term "model" refers to a container for a set of elements maintained in a briefcase where the set of elements collectively represent (i.e. "model", in a colloquial sense of the term) an entity in the real-world. The entity in the real-world may be an individual unit of infrastructure. In one embodiment, models may nest. That is, a model is said to "break down" a particular element (e.g., an infrastructure element) into a finer-grained description (i.e. a description that describes the same entity in the real-world but at a fine granularity).

As used herein, the term "relationship" refers to a connection that relates two or more elements, aspects or models. Examples of relationships include parent-child relationships that may imply ownership and peer-peer relationships that may define groups.

Example Embodiment

Figure 1:
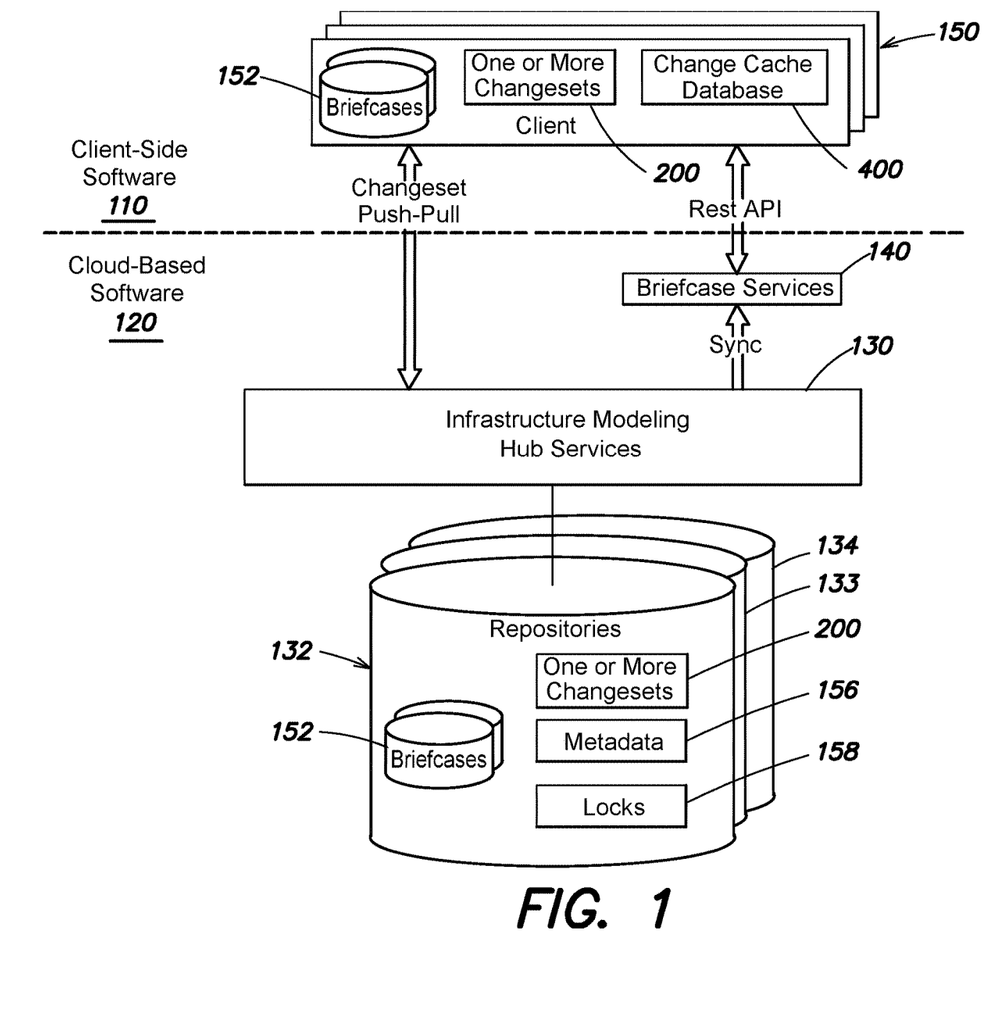
FIG. 1 is a high-level block diagram of at least a portion of an example infrastructure modeling software architecture in accordance with an example embodiment.

FIG. 1 is a high-level block diagram of at least a portion of an example infrastructure modeling software architecture. The architecture may be divided into client-side software 110 executing on one more or more computing devices arranged locally on-premises or hosted for an enterprise's use (collectively "client devices"), and cloud-based services software 120 that is executed on one or more remote computing devices ("cloud computing devices") accessible to the enterprise, and other enterprises, over the Internet.

At the core of the cloud-based services software 120 are infrastructure modeling hub services (e.g., iModelHub services) 130 that provide centralized management and synchronization support, and that work closely with briefcase services 140 that provide clash detection, validation, costing, publishing, analytics, among other services. Infrastructure modeling hub services (e.g., iModelHub services) 130 maintain repositories 132-134 that include briefcases 152, a set of accepted changesets (e.g., historical changesets) 200, metadata 156 (e.g., that includes storage locations, lookup identifiers, sequence information, etc. about the changesets), and locks 158 (e.g., that may provide pessimistic locking per element and per model). A briefcase 152 in a repository 132-134 may begin as an empty "baseline" briefcase that is programmatically generated and may be persisted by infrastructure modeling hub services (e.g., iModelHub services) 130. The repository may be modified by accepting new changesets into the sets of accepted changesets 200. A changeset may be created by change-detection functionality that records the actual and specific effects of modifications made to a briefcase. A new changeset may only be accepted as a modification of the repository (i.e. into the set of accepted changesets 200) if it holds changes relative to a briefcase that is of the most recent version of the repository's information. As the number of changesets in the set of accepted changesets 200 grows, the time required to take an empty "baseline" briefcase and apply all changesets needed to transform it into a briefcase at a specific version (e.g., the "most recent version") may grow large. For this reason, infrastructure modeling hub services (e.g., iModelHub services) 130 may create additional "snapshot" briefcases 152 at different versions. When a specific version (e.g., the "most recent version") of a briefcase is needed, the briefcase 152 closest to such version (which may be a "snapshot" briefcase) is accessed and changesets (or reverse changesets) from the set 200 are applied until a briefcase 152 of the needed version is obtained.

Clients 150 may be executed locally on desktop or mobile computing devices of an enterprise or hosted for the enterprise's use. Each client 150 may utilize a Hypertext Transfer Protocol (HTTP)-based representational state transfer (REST) application program interface (API) to communicate with the infrastructure modeling hub services (e.g., iModelHub services) 130 to obtain a local briefcase and changesets needed to transform it into a briefcase of a desired version of the repository 132-134. Clients may subscribe to notification functions provided by infrastructure modeling hub services (e.g., iModelHub services) 130 to receive notifications regarding new changesets in the repository's set of accepted changesets 200. The clients may then "pull" (download) the new changeset(s) and apply them to its briefcase to update it to the new version. Similar operations may occur when a client 150 modifies a briefcase, to propagate those changes. When a client modifies a version of a briefcase (e.g., version X), resulting in a modified briefcase with a provisional new version number (e.g., a provisional new version Y), a new provisional changeset (e.g., a provisional changeset Y) is generated from the modifications. The provisional changeset Y is then "pushed" (uploaded) to modeling hub services (e.g., iModelHub services) 130. If changeset X is still the most recent changeset that has been accepted into the repository's set of accepted changesets 200, then the provisional changeset Y is accepted into the set of accepted changesets 200 and becomes the new "most recent changeset" Otherwise, the client 152 may "pull" (download) any newer changeset(s) and apply them to its briefcase and reconcile any inconsistencies created by that update. After this "pull and merge" process is complete, the client 152 may attempt to "push" (upload) an updated provisional changeset to infrastructure modeling hub services (e.g., iModelHub services) 130.

After receiving the briefcase 152 from the cloud-based software 120, the client (e.g., 150) may make one or more changes to its local briefcase 152. Based on the one or more changes made to the briefcase 152, a changeset 200 may be created at the client that reflects a union of all additions, deletions, and modifications made to the briefcase 152 over a period of time. Such changes may correspond to the insertion of a row in a table stored in the briefcase 152, a deletion of a row in a table stored the briefcase 152, and/or a modification to a column of an existing row in a table stored in the briefcase 152. The changeset 200 may store a variety of different information associated with the one or more changes made to the briefcase 152. For example, the information may include, but is not limited to, the type of change made, the cell(s) (e.g., row(s)/column(s)) of a table affected by the change, the author of the change, the date/ time when the changeset 200 is uploaded (e.g., pushed/pulled) to the infrastructure modeling hub services 130 (e.g., iModel™ hub services), etc.

Each changeset 200 is persisted and assigned an identifier by the infrastructure modeling hub services 130. Each changeset 200, other than the first changeset created for the briefcase 152, stores an identifier of its parent changeset such that all the changesets 200 together form a history of all changes made to the repository (e.g., infrastructure modeling repository).

For example, let it be assumed that user John Gooding is working with a locally stored briefcase 152 which represents a water distribution system (i.e., infrastructure). In addition, let it be assumed that John Gooding wants to make one or more changes to an infrastructure model of the water distribution system stored in the briefcase 152. Specifically, John Gooding may make a first change utilizing the client device by modifying a diameter of a first flange, in the infrastructure model, from 350 cm to 450 cm. For example, John Gooding may use a pointing device (e.g., mouse) and/or keyboard to modify the diameter of the first flange in the infrastructure model from the first value of 350 cm to the second value of 450 cm. The first flange in the infrastructure model may, for example, correspond to a particular row of a particular table stored in briefcase 152. In this example, the first flange corresponds to row 34 of a "bis_Element" table stored in briefcase 152. In addition, the diameter of the first flange may correspond to a particular column of row 34. In this example, the diameter of the first flange corresponds to the column entitled "col_dia" of row 34.

In addition, John Gooding makes a second change to the infrastructure model representing the water distribution system by inserting a new flange in the infrastructure model. For example, John Gooding may select, using a pointing device and/or keyboard, a new flange from a template or other type of graphical user interface (GUI) and place the new flange in the infrastructure model. In this example, the new flange is a steel flange having a diameter of 125 cm, a rating of "F", and a code of "FL_3234." The new flange may be preconfigured or the user may utilize the pointing device and/or keyboard to assign particular attributes to the new flange. By adding the new flange to the infrastructure model, a new row may be generated and inserted into a particular table stored in briefcase 152. In addition, particular values may be placed in columns of the newly created row based on the attributes of the new element (e.g., flange) added to the infrastructure model. In this example, new row 124 is inserted into table "bis_Element" for the new flange added to the infrastructure model. In addition, the attributes of the new flange (e.g., material, rating, diameter, and code) are placed in particular columns of the new row 124.

Figures 2A, 2B:
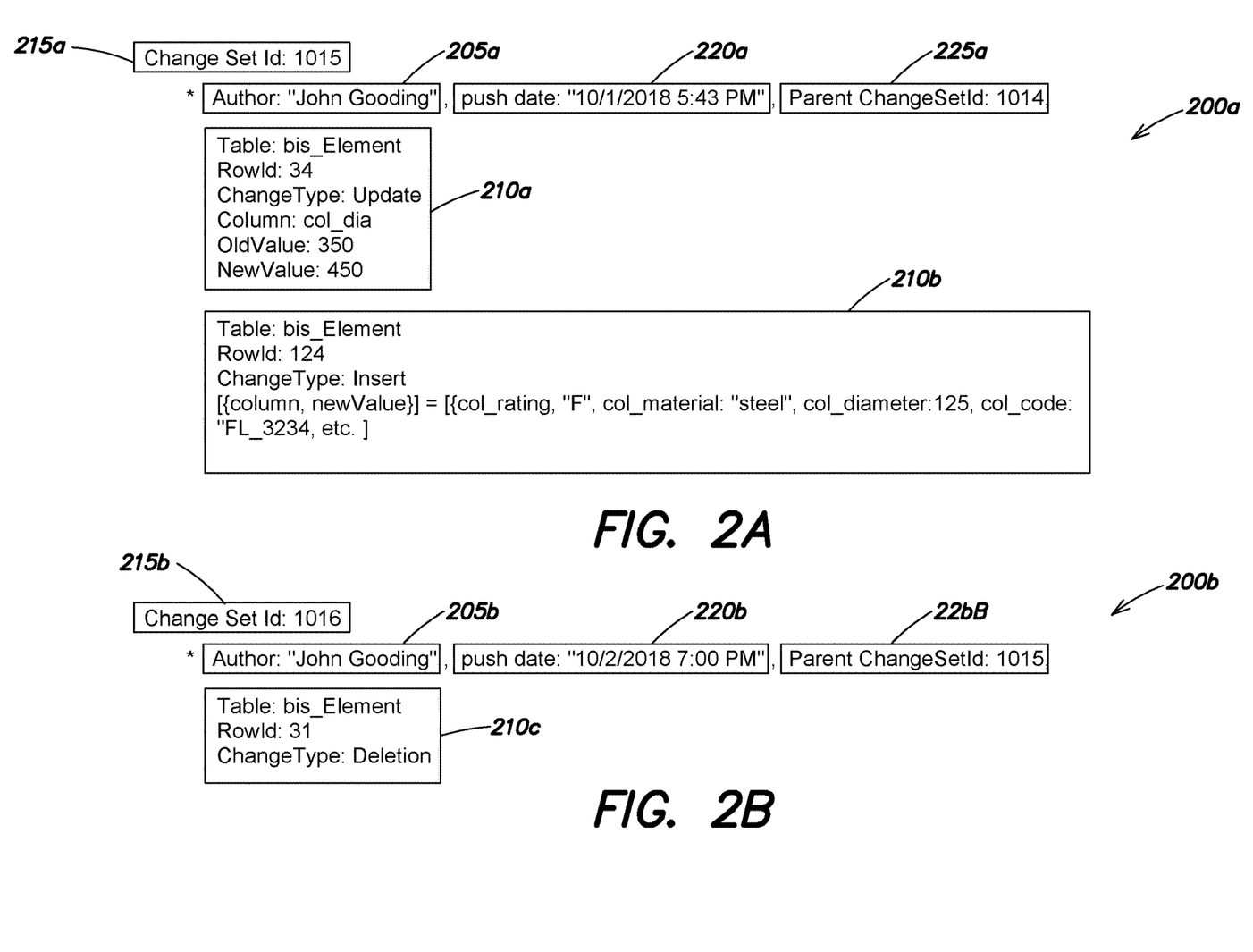
FIG. 2A is a first changeset in accordance with an example embodiment.
FIG. 2B is a second changeset in accordance with an example embodiment.

FIG. 2A depicts a first changeset according to one or more example embodiments descried herein. As depicted in FIG. 2A, the first changeset 200a includes a plurality of fields that store information associated with the first change and second change made to briefcase 152 as describe herein. Specifically, an author field 205a of the first changeset 200a stores an identifier of the individual/person who made the one or more changes. In this example, John Gooding made the first change and the second change. Thus, an identifier for John Gooding (e.g., John.Gooding) is stored in the author field 205a of the first changeset 200a.

Further, one or more change information fields store information associated with each of the changes made to the briefcase 152. For this example, and for the first change, a first change information field 210a stores information associated with the modification (i.e., update) made to the diameter of the first flange in the infrastructure model. Specifically, the first change information field 210a stores information indicating that the column entitled "col_dia" of row 34 of table "bis_Element" is updated from an old value of 350 cm to a new value of 450 cm. As such, the first change information field 210a for the first changeset 200a stores the relevant information associated with the modification to the diameter of the first flange in the infrastructure model made by John Gooding.

Further, a second change information field 210b stores information associated with the second change made to the briefcase 152. For this example, the second change information field 210b stores information associated with the addition of the new flange to the infrastructure model. Specifically, the second change information field 210b stores information indicating that that new row 124 is inserted into the "bis_Element" table based on the addition of the new flange to the infrastructure model. In addition, the second change information field 210b stores information associated with the attributes of the new flange. Specifically, the second change information field 210b stores information indicating the values stored in each column of the new row 124 in the "bis_Element" table.

In this example, the second change information field 210b stores information indicating that the column entitled rating (e.g., col_rating) of new row 124 stores a value of F for the rating of the new flange. In addition, the second change information field 210b stores information indicating that the column entitled material (e.g., col_material) of new row 124 stores a value of steel for the material of the new flange. Moreover, the second change information field 210b stores information indicating that the column entitled diameter (e.g., col_diameter) of new row 124 stores a value of 125 for the diameter of the new flange. Further, the second change information field 210b stores information indicating that the column entitled code (e.g., col_code) of new row 124 stores a value of FL_3234 for the code of the new flange. As such, the second change information fields 210b for the first changeset 200a stores the relevant information associated with the addition of the new flange to the infrastructure model by John Gooding. Although reference is made to the first changeset 200a including two change information fields, it is expressly contemplated that a changeset may include a single change information field or any number of change information fields.

In addition, the change set identifier field 215a stores a unique identifier that identifies the first changeset 200a and distinguishes the first changeset 200a from all other changesets that, for example, are received at the infrastructure modeling hub services 130. The identifier may be assigned by the infrastructure modeling hub services 130 when the changeset is uploaded (e.g., pushed/pulled) to the infrastructure modeling hub services 130. In this example, the client device uploads the first changeset 200a to the infrastructure modeling hub services 130 on Oct. 1, 2018 at 5:45 PM. As such, the change set identifier of 1015 is assigned to the first changeset 200a by the infrastructure modeling hub services 130 and stored in the change set identifier field 215a. In addition, the date and time the first changeset 200a was uploaded to the infrastructure modeling hub services 130 is stored in push date field 220a. In this example, Oct. 1, 2018 5:43 PM is stored in the push date field 220a. Further, the parent changesetId field 225a may store an identifier of the last changeset that was uploaded to the infrastructure modeling hub services 130 before the current changeset (e.g., the first change set 200a) is uploaded. In this example, the parentchangesetId field 225a stores a value of 1014.

Let it be assumed that at a later point in time and after the first changeset 200a has been uploaded to the infrastructure modeling hub services 130, John Gooding decides to make a further change to the water distribution system. In this example, John Gooding removes a pump from the infrastructure model and the pump corresponds to row 31 of the "bis_Element" table. Thus, a changeset may be created for the further change. FIG. 2B depicts s second changeset according to one or more example embodiments described herein. As depicted in FIG. 2B, the second changeset 200b includes a plurality of fields that store information associated with the further change to remove the pump from the infrastructure model representing the water distribution system and that is stored in briefcase 152. Specifically, author field 205b stores the identifier for John Gooding (e.g., John.Gooding) who removed the pump from the infrastructure model. In addition, a change information field 210c stores information associated with the removal of the pump. Specifically, the change information field 210c of the second changeset 200b stores information indicating that that row 31, corresponding to the removed pump, was deleted from the "bis_Element" table.

In addition, the change set Id field 215b stores a unique identifier that identifies the second changeset 200b and distinguishes the second changeset 200b from the first changeset 200a and all other changesets received at the infrastructure modeling hub services 130. In this example, the client device uploads the second changeset 200b to the infrastructure modeling hub services 130 on Oct. 2, 2018 at 7:00 PM. As such, the change set Id of 1016 is assigned to the second changeset 200b by the infrastructure modeling hub services 130 and stored in the change set Id field 215b. In addition, the date and time the second changeset 200b was uploaded to the infrastructure modeling hub services 130 is stored in the push date field 220b. In this example, a value of Oct. 2, 2018 7:00 PM is stored in the push date field 220b. Further, the parent changesetId field 225b stores the identifier of 1015 associated with the first changeset 200a, which is the parent changeset of the second changeset 200b.

The structure of the first and second changesets and the values and information stored in the first and second changesets are for exemplary purposes only. It is expressly contemplated that the changesets 200 described herein may have different structures and include less, additional, or other information that describes the changes made to the briefcase 152. Further, although reference is made to the entries in the changesets 200 storing a plurality of values/identifiers, it is expressly contemplated that each of the values/identifiers in the changesets 200 may be stored in a separate entry. For example, the values/identifiers in the second change information field 210b may be stored in separate fields. As such, the configuration of the changesets 200 is for exemplary purposes only.

The changeset 200 may be downloaded as compressed blobs at the infrastructure modeling hub services 130 and written to a file. For example, a changeset 200 from a client may be downloaded by the infrastructure modeling hub services 130 and stored in the repository (e.g., 132-134) as a file such that the infrastructure modeling hub services 130 has the information associated with all changes made to the briefcases being worked on by, for example, a plurality of different clients. The infrastructure hub component 130 may then provide one or more changesets 200 to a client 150. The client device may then utilize locally generated changesets 200 and/or the one or more received changesets 200 to create a change cache database.

Figure 3:
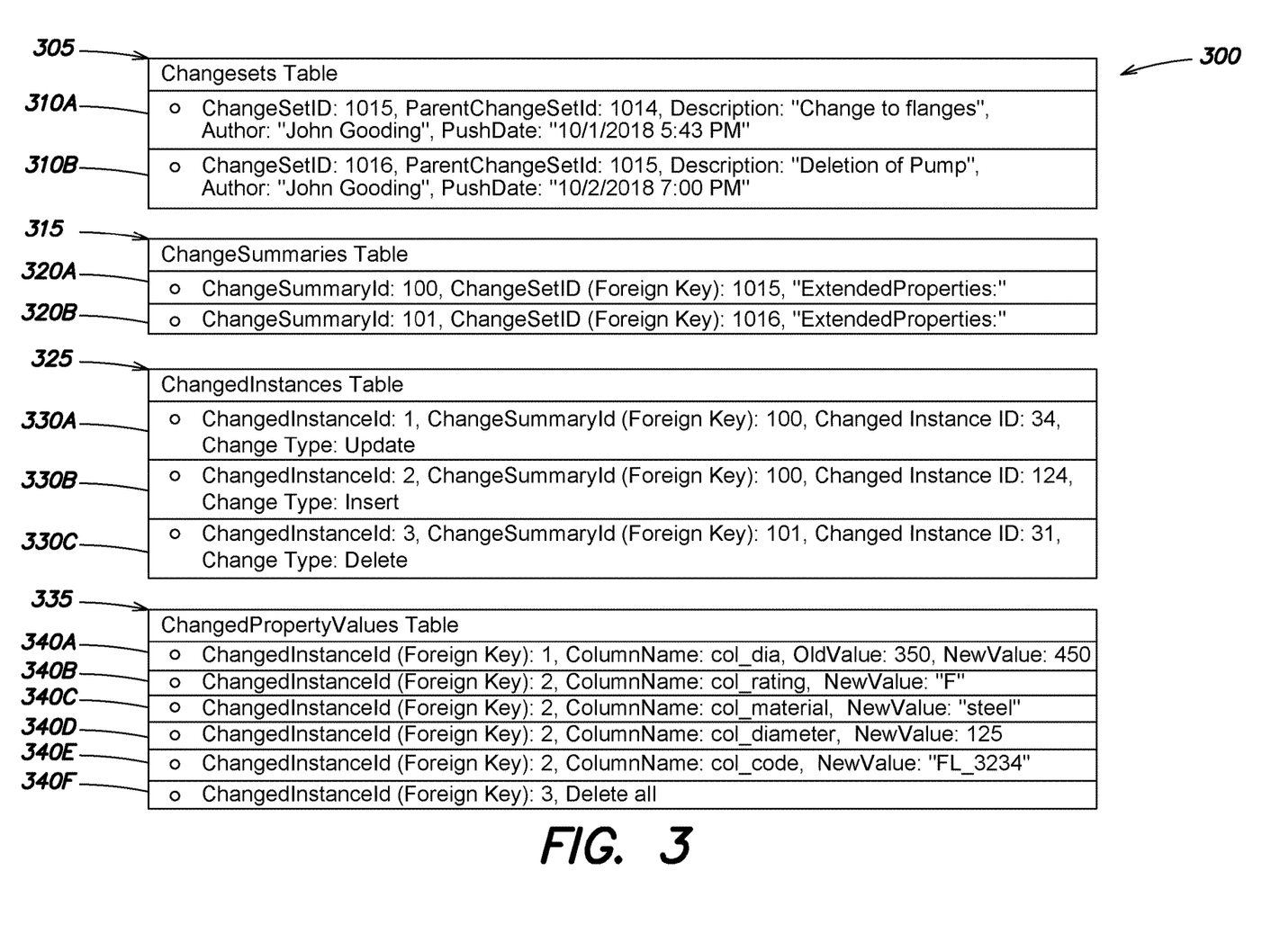
FIG. 3 is a change cache database in accordance with an example embodiment.

FIG. 3 is a change cache database in accordance with an example embodiment. The change cache database 300 may include a plurality of tables that store summary information from locally generated changesets 200 and/or received changesets 200. For illustrative purposes, the change cache database 300 of FIG. 3 includes a plurality of tables that store summary information from the first changeset 200a and second changeset 200b as described herein. However, it is expressly contemplated that the change cache database 300 may store information and values from any of a variety of different changesets 200 that are locally generated at the client 150 and/or received at the client 150.

The change cache database 300 may include a changesets table 305 that stores information from the changesets 200 to be included in the change cache database 300. Specifically, the changesets table 305 may include a change set entry that stores information for each changeset received at the client 150. In this example, the client 150 (e.g., a different client device from the client device that generated changesets 200a and 200b) receives the first changeset 200a and the second changeset 200b from the infrastructure modeling hub services 130. As such, the changesets table 305 includes a first change set entry 310a that stores information associated with the first changeset 200a and a second change set entry 310b that stores information associated with the second changeset 200b. Specifically, the first change set entry 310a stores the changeset identifier of 1015 for the first changeset 200a that is associated with the modification of the first flange and the addition of the new flange (e.g., changes to flanges) to the infrastructure model. In addition, the first change set entry 310a stores the parent change set identifier of 1014 associated with the first changeset 200a. Further, the first change set entry 310a stores the identifier of John Gooding who is the author of the first changeset 200a and Oct. 1, 2018/5:43 PM which is the date and time the first changeset 200a was uploaded to the infrastructure modeling hub services 130. Moreover, the first change set entry 310a stores "changes to flanges" which is a description of the changes included in the first changeset 200a.

The second change set entry 310b stores the changeset identifier of 1016 for the second changeset 200b that is associated with the deletion of the pump from the infrastructure model. In addition, the second change set entry 310b stores the parent change set identifier of 1015 associated with the first changeset 200a. Further, the second change set entry 310b stores the identifier of John Gooding who is the author of the second changeset 200b and Oct. 2, 2018/7:00 PM which is the date and time the second changeset 200b was uploaded to the infrastructure modeling hub services 130. Moreover, the second change set entry 310b stores "deletion of pump" which is a description of the changes included in the second changeset 200b.

Further, the change cache database 300 includes a changesummaries table 315 that stores top level information associated with extracted summary information from the changesets 200 to be included in the change cache database 300. Specifically, the changesummaries table 315 may include a summary entry for each changeset received from a client device. The summary entry may store information, such as, but not limited to, a change summary identifier, the change set identifier associated with the changeset, etc. In this example, the changesummaries table 315 includes a first summary entry 320a for the first changeset 200a and a second summary entry 320b for the second changeset 200b. Specifically, the first summary entry 320a stores a unique change summary identifier of 100 assigned to the first summary entry 320a by the infrastructure modeling hub services 130. That is, each change summary identifier is unique for each summary entry. In addition, the first summary entry 320*a* stores the change set identifier of 1015 for the first changeset 200*a*. Further, the first summary entry 320*a* may store extended properties.

Moreover, the second summary entry 320*b* stores a unique change summary identifier of 101 assigned to the second summary entry 320*b* by the infrastructure modeling hub services 130. In addition, the second summary entry 320*b* stores the changeset identifier of 1016 for the second changeset 200*b*. Further, the second summary entry 320*b* may store extended properties that include.

In addition, the change cache database 300 includes a changedinstances table 325 that stores information for all the changed instances associated with the changes in the changesets 200 to be included in the change cache database 300. Specifically, the changedinstances table 325 may include a changed instance entry for each changed instances stored in the plurality of received changesets 200. The changed instance entry may store information, such as, but not limited to, a changed instance identifier, the changed summary identifier from the changedinstances table 325, and a changed instance identifier from the changeset. In this example, the changedinstances table 325 includes a first changed instance entry 330*a* for the modification of the first flange from the first changeset 200*a*, a second changed instance entry 330*b* for the addition of the new flange from the first changeset 200*a*, and a the third changed instance entry 330*c* for the deletion of the pump from the second changeset 200*b*.

Specifically, the first changed instance entry 330*a* stores information including a unique changed instance identifier of 1. That is, each changed instance entry in the changedinstances table 325 includes a different and unique changed instance identifier. In addition, the first changed instance entry 330*a* stores a change summary identifier obtained from the changesummaries table 315 and that is associated with the modification of the first flange. Since the modification of the first flange is from the first changeset 200*a*, the change summary identifier stored in the first changed instance entry 330*a* is 100. Further, since the first change was associated with an update to a column of an existing row, the first changed instance entry 330*a* stores an identifier of "update" (i.e., modify).

The second changed instance entry 330*b* stores information including a unique identifier of 2. In addition, the second changed instance entry 330*b* stores a change summary identifier from the changesummaries table 315 and that is associated with the insertion of the new flange. Since the addition of the new flange is from the first changeset 200, the change summary identifier stored in the second changed instance entry 330*b* is 100. Further, since the second change was associated with insertion of a new row, the second changed instance entry 330*b* stores an identifier of "insert."

The third changed instance entry 330*c* stores information including a unique identifier of 3. In addition, the third changed instance entry 330*c* stores a change summary identifier from the changesummaries table 315 and that is associated with the deletion of the pump. Since the deletion of the pump is from the second changeset 200*b*, the change summary identifier stored in the third changed instance entry 330*c* is 101. Further, since the further change was associated with a deletion of a row, the third changed instance entry 330*c* stores an identifier of "delete."

Further, the change cache database 300 includes a changedpropertyvalues table 335 that stores information that summarizes the property values associated with the changes in the changesets 200 to be included in the change cache database 300. Specifically, the changedpropertyvalues table 335 may include a changed property value entry for each property value associated with each change in the received changesets 200. The changed property value entry may store information, such as, but not limited to, a changed instance identifier associated with a change and a property value associated with the change. In this example, the modification of the first flange is a single property value change to the diameter of the first flange. As such, a first change property value entry of 340*a* stores the changed instance identifier of 1 from the changedinstances table 325 and that is associated with the first flange. In addition, the first change property value entry 340*a* stores the column identifier (e.g., col_dia) for the diameter of the first flange and the old value (350) and the new value (450) for the diameter of the first flange.

Moreover, and in this example, the insertion of the new flange includes four different property values. Specifically, each of the four property values correspond to a different column of row 124 associated with the addition of the new flange. As such, there are four different change property value entries 340*b*, 340*c*, 340*d*, and 340*e* for the four different properties (rating, material, diameter, code) of the new flange. Specifically, the change property value entry 340*b* stores a changed instance identifier of 2 from the changedinstances table 325 and that is associated with the addition of the new flange. In addition, the change property value entry 340*b* stores a column identifier of col_rating and a value of F for the rating property of the new flange. Moreover, the change property value entry 340*c* stores a changed instance identifier of 2 from the changedinstances table 325 and that is associated with the addition of the new flange. Further, the change property value entry 340*c* stores a column identifier of col_material and a value of steel for the material property of the new flange. Furthermore, the change property value entry 340*d* stores a changed instance identifier of 2 from the changedinstances table 325 and that is associated with the addition of the new flange. In addition, the change property value entry 340*d* stores a column identifier of col_diameter and a value of 125 for the diameter property of the new flange. Moreover, the change property value entry 340*e* stores a changed instance identifier of 2 from the changedinstances table 325 and that is associated with the addition of the new flange. In addition, the change property value entry 340*d* stores a column identifier of col_code and a value of FL_3234 associated with the code property of the new flange.

Furthermore, the change property value entry 340*f* stores a changed instance identifier of 3 from the changedinstances table 325 and that is associated with the deletion of the pump. In addition, the change property value entry 340*f* stores an identifier (e.g., delete all) indicating that all information associated with the pump is deleted. Although reference is made to the entries in the tables of the change cache database 400 storing a plurality of values/identifiers, it is expressly contemplated that each of the values/identifiers may be stored in a separate entry. For example, each of the identifiers in changed property value entry may be stored in a separate entry of a same row. As such, the structure of the tables and change cache database are for exemplary purposes only. In addition, although the example provided herein describes utilizing changesets from a single client device to generate the change cache database, it is expressly contemplated that changesets from a plurality of different client devices may be utilized to generate the change cache database. Advantageously, the change cache database 400 includes information associated with all changes made to the briefcase from all the different client devices.

Figure 4:
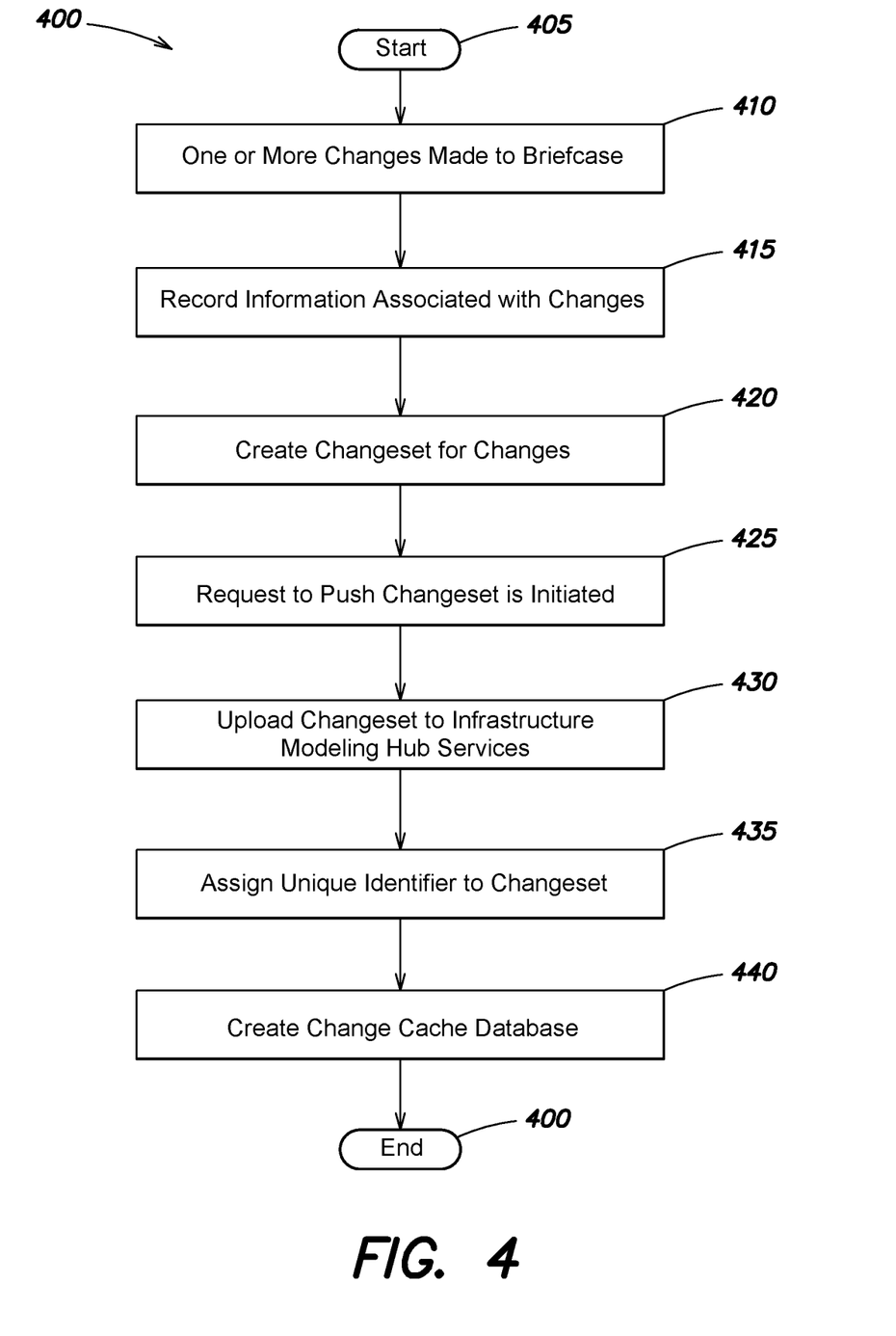
FIG. 4 is a flow diagram for generating a change cache database in accordance with an example embodiment.

FIG. 4 is a flow diagram for generating a change cache database in accordance with an example embodiment. The procedure 400 starts at step 405 and continues to step 410 where one or more changes are made to a briefcase 152 representing an infrastructure. For example, a user may utilize the client 150 to make on or more changes (e.g., insertion, deletion, modification) to an infrastructure model stored in a briefcase 152 that is received over the network from infrastructure modeling hub services 130. The modifications may cause, for example, cells (e.g., columns/rows) of one or more tables maintained in the briefcase 152 to be modified, deleted, and/or inserted. The procedure continues to step 415 and information associated with the one or more changes is recorded. For example, the information may include, but is not limited to, the type of changes made, the author of the changes, the column/rows of a particular table affected by the changes, a parent changeset identifier, etc.

The procedure continues to step 420 and a changeset is created at the client device. The changeset 200 includes information associated with one or more changes made to the briefcase 152 at the client device. FIGS. 2A and 2B are exemplary changesets 200a and 200b created in accordance with one or more embodiments described herein. The procedure continues to step 425 and a request to upload the changeset to the infrastructure modeling hub services 130 (e.g., iModel™ hub services) is initiated. For example, the client device may initiate the request to push the change to the infrastructure modeling hub services 130. Alternatively, the infrastructure modeling hub services 130 may send a request, over the network and to the client device, that the client device push the changeset to the infrastructure modeling hub services 130.

In response to the request, the procedure continues to step 430 and the changeset is uploaded to the infrastructure hub services 130. Specifically, the client 150 may transmit the changeset 200 to the infrastructure modeling hub services 130 over a wired/wireless network. In addition, and prior to uploading the changeset 200 to the infrastructure modeling hub services 130, the client device may include in the changeset 200 the date/time the changeset 200 is uploaded to the infrastructure modeling hub services 130. The procedure continues to step 435 and the infrastructure modeling hub services 130 assigns a unique identifier to the received changeset 200. Specifically, the infrastructure modeling hub services 130 assigns the identifier to the changeset 200 such that the changesets 200 received from the same client device and from different clients are distinguishable. The changeset 200 may then be stored in the repository 132-134.

The procedure continues to step 440 and a change cache database is created at a client 150 based on the changesets locally generated at the client 150 and/or the changesets 200 received at the client 150. For example, the client (e.g., the same or different client from the client that created the changesets 200a and 200b) may utilize a GUI or command line interface (CLI) such that one or more changesets 200 from a particular repository are transmitted from the infrastructure modeling hub service 130 over a network to the client 150. The client 150 extracts information associated with the changes in the locally generated changesets 200 and/or received changeset 200 to generate a plurality of tables for the change cache database 300. Each table, of the plurality of tables in the change cache database 300, stores particular summary information from the changesets 200 and/or the one or more changes in the changesets 200. FIG. 3 is an exemplary change cache database 300 that includes a plurality of tables storing summary information associated with the one or more changes in the changesets 200 (e.g., the first changeset 200a and second changeset 200b). For example and in the case where a client 150 needs to query the change history of a repository over some range of changesets from M to Q, the client 150 can receive a briefcase at version M, Q, or some version between M and Q, and also receive changesets M through Q, and apply those changesets to generate the local change cache database 300. The procedure then ends at step 445.

After the change cache database 300 is generated, the change cache database 300 may be attached to the briefcase 152 utilizing a relational database command (e.g., an ECSQL™ command). For example, and to attach a change cache database to the model in the briefcase 152, the client may use the ECSQL™ command of:

attachChangeCache(iModel);

where iModel is an identifier of the briefcase 152 the change cache database 300 will be attached to.

Further, the client may search the change cache database to determine what changes have been made to the repository from its genesis to completion. That is, each of the plurality of clients may search the locally generated and stored change cache database to determine what changes have been made to repository, when the changes were made, who made the changes, etc. Specifically, the client may utilize a GUI or a CLI to input one or more queries to search the change cache database generated and stored at the client. For example, a query may be an ECSQL™ query of classes and properties.

For example, the client may issue a request to extract change summaries associated with a particular repository starting with a specified version of a briefcase. To extract the change summaries, the client may use the ECSQL™ query of:

extractChangeSummaries (iModel, startVersion);

where "iModel" is an identifier of the repository of interest to the user and "startVersion" is the specified version of a briefcase that the user wants to start with.

In addition or alternatively, the client may issue a request for the identifiers of all changed instances in a specified change summary. To request the identifiers, the client may use the ECSQL™ query of:

SELECT ChangedInstance.Id, OpCode FROM ecchange.change.InstanceChange WHERE Summary.Id=X where "X" is a change summary identifier.

In addition or alternatively, the client may issue a request for the property values that have changed in a change summary with a particular identifier. To request the property values, the client may use the ECSQL™ query of:

SELECT i.ChangedInstance.Id, p.AccessString, i.OpCode FROM change.PropertyValueChange p JOIN change.InstanceChange i USING change.InstanceChangeOwnsPropertyValueChanges WHERE i.Summary.Id=X Where "X" is the particular identifier of the change summary.

In addition or alternatively, the client may issue a request for a change summary corresponding to a changeset along with the author, description of the changeset, and the push date. To request such information, the client may use the ECSQL™ query of:

SELECT Summary.Id,Author,Description,PushDate FROM ecchange.imodelchange.ChangeSet WHERE WsgId=X where "X" is the changeset identifier.

In addition or alternatively, the client may issue a request for changes after a change. For example, and to request changes after the insertion of a butterfly valve, the client may use the ECSQL™ query of:

SELECT Id, Code, Rating, Type FROM plant.Valve.Changes(:changeSummaryId, 'AfterInsert') WHERE Type='ButterflyValve'

In addition or alternatively, the client may issue a request for changes before a change. For example, and to request changes before the update of a gate valve, the client may use the ECSQL™ query of:

SELECT Id, Code, Rating, Type FROM plant.Valve.Changes(:changeSummaryId, 'BeforeUpdate') WHERE Type='GateValve'

In addition or alternatively, the client may issue a request for all change summaries that have affected a specific domain element. To request such information, the client may use the ECSQL™ query of:

SELECT DISTINCT Summary.Id FROM change.InstanceChange WHERE ChangedInstance.Id=X where "X" is the changed instance identifier.

In addition or alternatively, the client may issue a request for all change summaries that are associated with a particular operation (e.g., insertion, deletion, modification) of a particular element (e.g., valve, pump, flange, etc.). For example, and to request all change summaries associated with the insertion of butterfly valves, the client may use the ECSQL™ query of:

SELECT DISTINCT ic.Summary.Id
        FROM change.InstanceChange is
        JOIN meta.ECClassDef c
          ON ic.ChangedInstance.ClassId=c.ECInstanceId
        WHERE c.Name='ButterflyValve' AND ic.OpCode=OpCode.Insert The search query may be converted to a database query to search the change cache database 400 utilizing a mapping stored in the briefcase 152. Specifically, the client 150 may utilizing a mapping between the classes and properties of the query and rows and columns of the database to translate the query into database query (e.g., structured query language (SQL) query) that can be processed on the database (e.g., SQLite Db). For example, and with reference to the examples above for the modification of the first flange and insertion of the new flange, there may exist a mapping between a class "Flange" and the rows/columns of the "bis_Element" table. The database query is utilized to search the change cache database and to obtain information from the tables of the change cache database. The results are then output to the client and displayed, for example, on a display screen associated with the client. For example, the results may be displayed with the GUI or CLI utilized by the client to input the search query.

Figure 5:
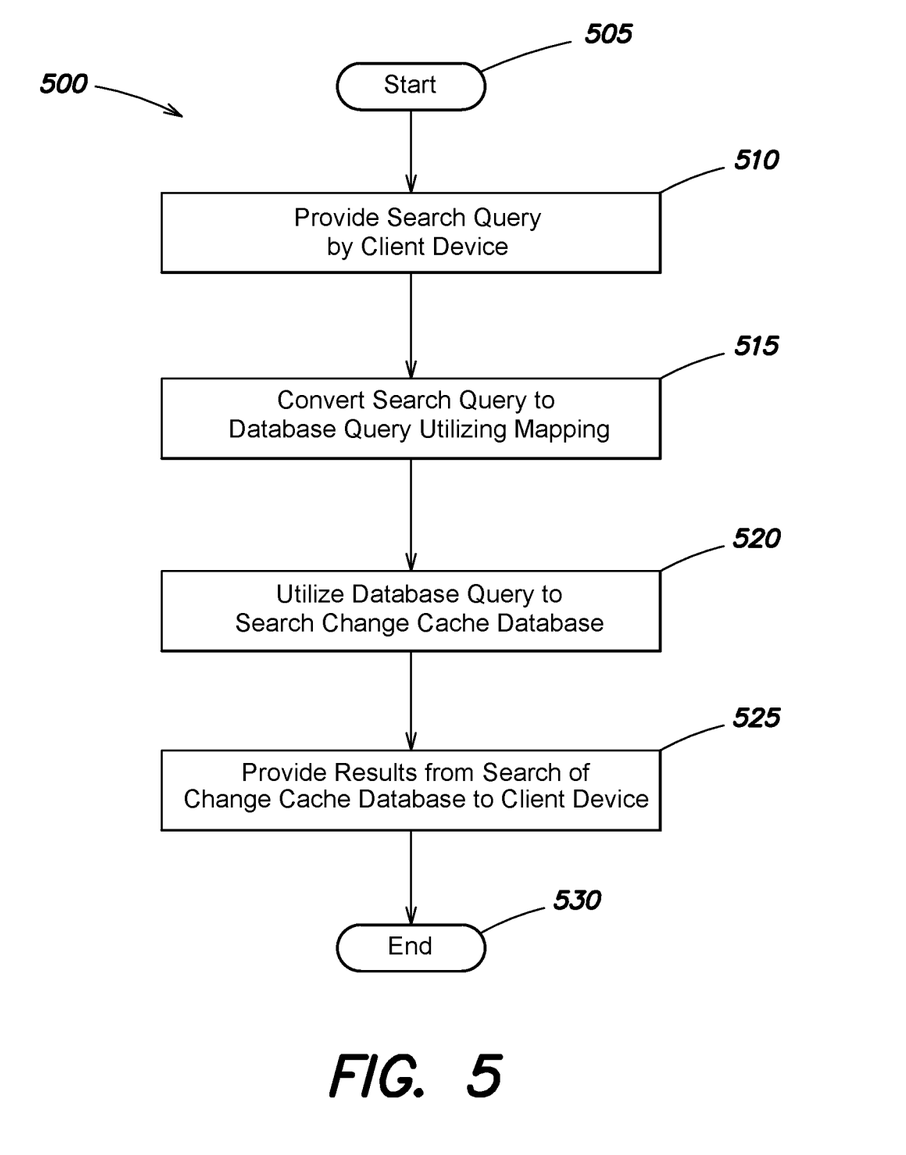
FIG. 5 is a flow diagram for searching a change cache database in accordance with an example embodiment.

FIG. 5 is a flow diagram for searching a change cache database in accordance with an example embodiment. The procedure 500 starts at step 505 and continues to step 510 where a client provides a search query to search the change cache database. Specifically, the client may input the search query into a GUI or CLI. More specifically, a user operating the client may utilize a pointing device and/or keyboard to input the search query into the GUI or CLI. The search query may be, for example, an ECSQL™ query of classes and properties.

The procedure continues to step 515 and the query is converted to a database query utilizing a mapping between classes and properties of the search query and the rows and columns of the change cache database. Specifically, the mapping may be maintained with the locally stored briefcase 152 and the client 150 may utilize the mapping to translate/convert the receive search query of classes and properties to rows and columns of the change cache database.

The procedure continues to step 520 and the database query is utilized to search the change cache database. Specifically, the database query includes one or more particular columns and/or rows identified in the mapping, and the data from the one or more particular column and/or rows is obtained. The procedure continues to step 525 and the results from the search of the change cache database are provided to the client. Specifically, the results may be displayed on a display screen of the client. For example, the results may be displayed in the GUI or CLI. The procedure then ends at step 530.

Thus, the change cache database 300 is an improved database in its structure (organization) and operability. Specifically, the change cache database of the present invention change cache database provides users with the ability to implement more robust and efficient searches to inspect the changes that are made to the repository. Specifically, the results from a search of the change cache database may allow a user to understand the changes made to the repository. Advantageously, a particular user may learn of the changes made to the repository by other users over a particular time span. In addition, the change cache database provides the user with the ability to perform a structured analysis on a subset of the changes made to the repository, or on changes made to a particular element. For example, a client device may search the change cache database to analyze just the changes made to a particular infrastructure element.

Even further, the information from the change cache database may be utilized to determine which infrastructure elements are being actively changed such that a heat map of regions of an infrastructure model can be generated. Moreover, the change cache database may be utilized to generate reports associated with the changes made to a repository such that the maturity of the repository from its genesis can be understood more effectively.

In addition, the changesets created at client 150 may be discarded after they are transmitted to the cloud-based software 120. Thus, the memory requirements of the client devices are reduced. In addition, the change cache database and its structure allows for more efficient searches that require less processing capabilities of the client devices.

It should be understood that a wide variety of adaptations and modifications may be made to the techniques. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. An infrastructure modeling system, comprising:
    a client device including a processor, the processor configured to:

generate one or more local changesets, wherein each local changeset of the one or more local changesets includes information for one or more changes made to a briefcase that is an instance of a repository that represents an infrastructure that is a real-world physical structure, wherein the one or more local changesets are generated based on one or more changes that are made to a model representing the infrastructure at the client device;

receive one or more remote changesets over a network, where each remote changeset of the one or more remote changesets includes other information for one or more other changes made to the briefcase by one or more remote client devices, wherein the one or more remote changesets are generated based on one or more other changes that are made to the model representing the infrastructure at the one or more remote client devices;

generate, by utilizing at least the one or more local changesets and the one or more remote changesets for a first database generation process at the client device, a first instance of a user searchable change cache database at the client device, wherein the user searchable change cache database includes one or more tables, each table of the one or more tables storing at least change summary information which is based on the information and other information, and wherein the change summary information describes a set of changes made to the model representing the infrastructure at the client device and the one or more remote devices;

provide a search query, in response to receiving a search request, to search the user searchable change cache database, wherein the search query requests infrastructure data that is related to an insertion, a deletion, or a modification of an infrastructure element in the model representing the infrastructure;

search the user searchable change cache database utilizing the search query to select particular change summary information from the one or more tables; and display the particular change summary information.

2. The infrastructure modeling system of claim 1, wherein the information associated with the one or more local changes includes one or more of a type of change made to the briefcase, an author of the change made to the briefcase, a date of the change was made to the briefcase, a time of the change was made to the briefcase, and a cell of a selected table affected by the change.

3. The infrastructure modeling system of claim 1, wherein the search query is a relational database query in a first query language.

4. The infrastructure modeling system of claim 3, wherein the processor is further configured to translate the relational database query into a second query language utilizing a mapping that maps classes and properties to rows and columns, wherein the relational database query in the second query language is utilized to search the user searchable change cache database.

5. The infrastructure modeling system of claim 1, wherein the search query requests data before or after a particular change is made to the briefcase.

6. A computer-implemented method, comprising:

generating, at a first client device, one or more local changesets, wherein each local changeset of the one or more local changesets includes information for one or more changes made to a briefcase that is an instance of a repository that represents an infrastructure that is a real-world physical structure, wherein the one or more local changesets are generated based on one or more changes that are made to a model representing the infrastructure at the first client device;

receiving one or more remote changesets over a network, where each remote changeset of the one or more remote changesets includes other information for one or more other changes made to the briefcase by one or more remove client devices, wherein the one or more remote changesets are generated based on one or more other changes that are made to the model representing the infrastructure at the one or more remote client devices;

generating, by utilizing the one or more remote changesets and the one or more local changesets for a first database generation process at a second client device, a first instance of a user searchable change cache database at the second client device, wherein the user searchable change cache database includes one or more tables, where each table of the one or more tables stores change summary information which is based on the other information from the one or more remote changesets and the information from the one or more local changesets, and where the change summary information describes a set of changes made to the model representing the infrastructure, wherein the first client device and the second client device are different devices;

receiving, from the second client device, a search query to search the user searchable change cache database, wherein the search query requests infrastructure data that is related to an insertion, a deletion, or a modification of an infrastructure element in the model representing the infrastructure;

searching, at the second client device, the user searchable change cache database by utilizing the search query to select particular change summary information from the one or more tables; and displaying, at the second client device, the particular change summary information.

7. The method of claim 6, wherein the information associated with the one or more changes includes one or more of a type of change made to the briefcase, an author of the change made to the briefcase, a date of the change was made to the briefcase, a time of the change was made to the briefcase, and a cell of a selected table affected by the change.

8. The method of claim 6, wherein the search query is a relational database query in a first query language.

9. The system of claim 8, further comprising translating the relational database query into a second query language utilizing a mapping that maps classes and properties to rows and columns, wherein the relational database query in the second query language is utilized to search the user searchable change cache database.

10. The method of claim 6, wherein the search query requests data before or after a particular change is made to the briefcase.

11. A non-transitory computer readable medium having software encoded thereon, the software when executed by one or more computing devices operable to:

generate one or more local changesets, wherein each local changeset of the one or more local changesets includes information for one or more changes made to a briefcase that is an instance of a repository that represents an infrastructure that is a real-world physical structure, wherein the one or more changesets are generated based on one or more changes that are made to a model representing the infrastructure at a client device;

receive one or more remote changesets over a network at the client device, where each remote changeset of the one or more remote changesets includes other information for one or more other changes made to the briefcase by one or more remote client devices, wherein the one or more remote changesets are generated based on one or more other changes that are made to the model representing the infrastructure at the one or more remote client devices;

generate, by utilizing at least the one or more local changesets and the one or more remote changesets for a first database generation process at the client device, a first instance of a user searchable change cache database at the client device, wherein the user searchable change cache database includes one or more tables, each table of the one or more tables storing at least change summary information which is based on the information and other information, and wherein the change summary information describes a set of changes made to the model representing the infrastructure at the client device and the one or more remote devices;

receive, in response to a search request, a search query at the client device to search the user searchable change cache database, wherein the search query requests infrastructure data that is related to an insertion, a deletion, or a modification of an infrastructure element in the model representing the infrastructure;

search the user searchable change cache database by utilizing the search query to select particular change summary information from the one or more tables; and display the particular change summary information.

12. The non-transitory computer readable medium of claim 11, wherein the information associated with the one or more local changes includes one or more of a type of change made to the repository, an author of the change made to the repository, a date of the change was made to the repository, a time of the change was made to the repository, and a cell of a selected table affected by the change.

13. The non-transitory computer readable medium of claim 11, wherein the software when executed further operable to translate relational database query into a second query language by utilizing a mapping that maps classes and properties to rows and columns, wherein the relational database query in the second query language is utilized to search the user searchable change cache database.

14. The non-transitory computer readable medium of claim 11, wherein the search query requests data before or after a particular change is made to the briefcase.

* * * * *